United States Patent
Bömcke

(10) Patent No.: US 6,234,913 B1
(45) Date of Patent: May 22, 2001

(54) METHOD OF MANUFACTURING OF FASTENING ELEMENTS

(75) Inventor: Christian Bömcke, Röthis (AT)

(73) Assignee: Hilti Akteingesellschaft, Schaan (LI)

( * ) Notice: Subject to any disclaimer, the term of this patent is extended or adjusted under 35 U.S.C. 154(b) by 0 days.

(21) Appl. No.: 09/566,259

(22) Filed: May 5, 2000

(30) Foreign Application Priority Data

May 31, 1999 (DE) .............................................. 199 24 903

(51) Int. Cl.[7] ...................................................... B21G 3/00
(52) U.S. Cl. .................. 470/34; 470/8; 470/38; 72/302; 72/342.94; 72/378
(58) Field of Search .............. 72/377, 378, 302, 72/342.94, 342.96; 470/8, 9, 11, 12, 34, 36, 37, 38

(56) References Cited

U.S. PATENT DOCUMENTS

| | | | |
|---|---|---|---|
| 1,995,234 | * | 3/1935 | Wenzlisk ................................ 72/378 |
| 3,218,136 | * | 11/1965 | Hogan et al. ........................... 72/302 |
| 3,588,933 | * | 6/1971 | Shinopulos ............................... 470/9 |
| 4,014,199 | * | 3/1977 | Coons et al. ........................... 72/302 |

FOREIGN PATENT DOCUMENTS

| | | | |
|---|---|---|---|
| 59-78717 | * | 5/1984 | (JP) ....................................... 72/302 |
| 63-183740 | * | 7/1988 | (JP) ................................... 72/342.94 |

* cited by examiner

Primary Examiner—Ed Tolan
(74) Attorney, Agent, or Firm—Brown & Wood, LLP

(57) ABSTRACT

A method for manufacturing of fastening elements (5, 6) and including producing a blank (1) having a length exceeding a combined length of two fastening elements, upsetting a head (2, 3) at each of opposite ends of the blank (1), heating a section of the blank (1) located between the opposite heads (2, 3) formed at the opposite ends of the blank, and, thereafter, pulling apart the heated section (4) until the heated section (4) is separated.

7 Claims, 1 Drawing Sheet

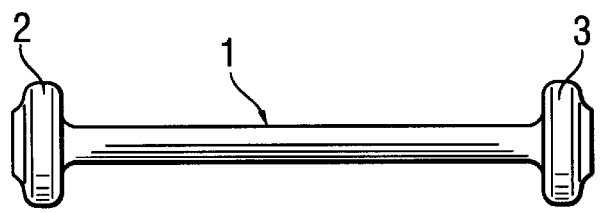
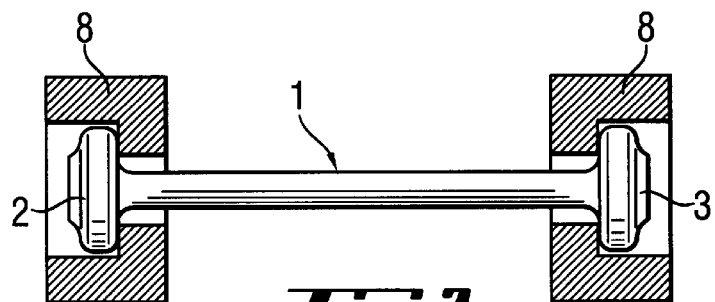
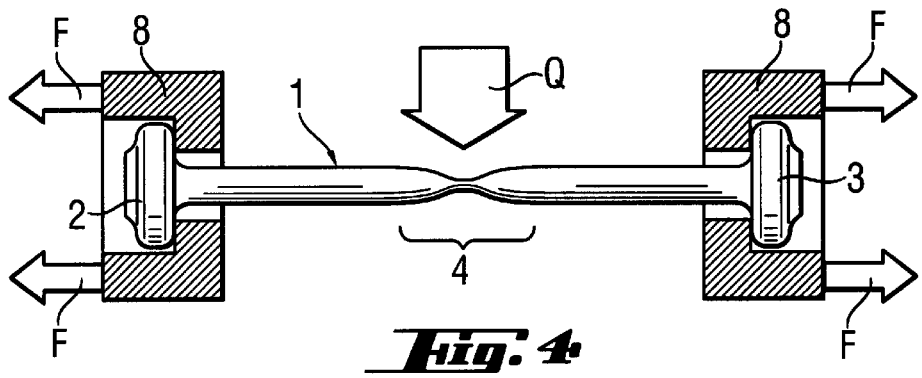
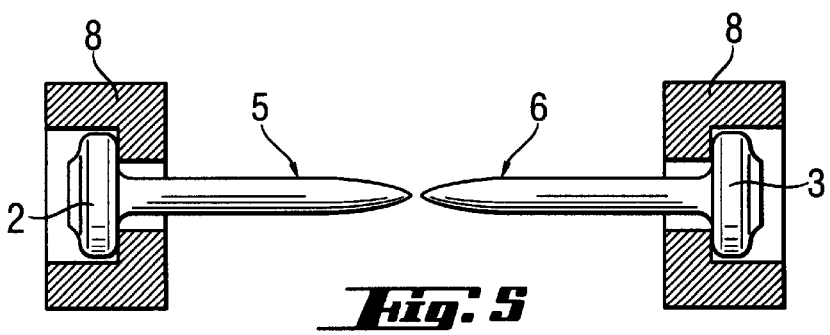

METHOD OF MANUFACTURING OF FASTENING ELEMENTS

BACKGROUND OF THE INVENTION

1. Field of the Invention

The present invention relates to a method of manufacturing of fastening elements according to which a head is upset at one end of a blank and a point is formed at the opposite end of the blank.

2. Description of the Prior Art

A method of manufacturing of fastening elements according to which in a first step, a blank, having a length greater than a length of a produced fastening element, is cut off from a wire having a predetermined diameter. Then, a head is upset at one end of the blank, and a point is formed at the opposite end of the blank by hammer-forging. During forging, the cylindrical end of the blank is formed, in a cold condition, into a somewhat crowned shape by being impacted with two hammer cheeks.

Because forging with hammer cheeks generates a lot of noise, the forging apparatus should be encapsulated, and the working zone need by designated as a noise protection zone in which wearing of hearing protection gear is required. However, encapsulating of the forging apparatus makes an access thereto very difficult, and the ergonomy of the working place substantially decreases.

A further drawback of hammer-forging consists in extensive wear of the hammer cheeks. The essentially continuous wear of the hammer cheeks results in change of the shape of the point and, thus, in reduction in quality of the produced fastening elements.

Because a separate blank is needed for each fastening element, the output is rather low and, accordingly, the manufacturing costs are high.

Accordingly, an object of the present invention is a method of manufacturing of fastening elements which would insure a high output and small manufacturing costs.

Another object of the present invention is a method of manufacturing of fastening elements which would insure a constant quality of the points of the fastening elements.

A further object of the present invention is a method of manufacturing of fastening elements which would provide for wear-free formation of the points of the fastening elements and would insure a substantial reduction in noise generation.

SUMMARY OF THE INVENTION

These and other objects of the present invention, which will become apparent hereinafter, are achieved by providing a method including producing a blank having a length exceeding a combined length of two fastening elements, upsetting a head at each of opposite ends of the blank, heating a section of the blank located between the opposite heads formed at the opposite ends of the blank, and, thereafter, pulling apart the heated section until the heated section is separated.

The inventive method permits to substantially reduce the manufacturing costs. Because two fastening elements are produced from a single blank, the output substantially increases. The formation of the points by the combined action of heat and pulling forces insures a wear-free manufacturing and a constant quality of the points.

Preferably, the heads at the opposite ends of the blank are so upset that their outer profile extends, in a direction perpendicular to the longitudinal extent of the blank, beyond the outer profile of the blank. The so produced fastening elements are particularly suitable for fastening of constructional parts to a structural component, with a constructional part being pressed against the structural component with the head of the fastening element.

A reliable and rapid deformation of the section which is located between the two heads, is obtained when this section is heated to a temperature lying in a range from 900° to 1,200° C.

The length of the crown-conical point depends on the length of the heated section of the blank. Good drive-in properties of a fastening elements and a high rigidity of the point are obtained when the length of the heated section of the blank exceeds the thickness of the blank, measured in a direction transverse to a longitudinal extend of the blank, in 2–8 times.

For rapid heating of the heated section of the blank, preferably, induction heating is used. The heating is effected with an inductor through which the heated section is displaced. The inductor is displaceable between the two heads. By displacing the inductor, the position of the heated section can be changed along the blank. The displacement of the inductor provides a possibility to form two fastening elements with the same length or having two different lengths.

Advantageously, the heated section is pulled apart by placing the blank heads into two, spaced from each other, pulling tools movable in opposite directions. To this end, the two heads facing each other have annular shoulders against which the two pulling tools are supported, without causing any damage to the heads.

In order to be able to economically produce a device for pulling the blank, preferably the pulling forces acting on the blank are produced with an aid of a spring which is kept in a preloaded condition until to the end of the heating process and is released after the heating process ends.

The necessary pulling force depends on the blank material, the crosssectional size of the blank, the heating temperature, and the point geometry. Preferably, the applied pulling force amounts from 200 N to 2,000 N.

The point geometry depends on the amount of heating energy applied for heating the heated section of the blank, on the magnitude of the pulling force, and on the speed with which the blank is pulled apart. E.g., if the amount of heating energy used for heating the heated section is high or the pulling force is high, the points of the two fastening elements would have an increased length and a small point angle. With application of a small amount of heating energy or with application of a small pulling force to the blank, the points of the fastening elements would have a small length and a large point angle.

After upsetting of the heads and before the heating of a blank section, washing can take place to remove the phosphate layer and lubrication means used during the upsetting of the blank ends.

In order to be able to use a setting tool for driving-in of the fastening elements, the fastening elements should have a sufficient hardness. Hardening is effected after the fastening elements have been formed by pulling the blanks apart.

Particularly good drive-in properties of the fastening elements are achieved when they are covered with zinc layer which serves both as lubrication means and a slip addictive.

The novel features of the present invention, which are considered as characteristic for the invention, are set froth in the appended claims. The invention itself, however, both as to its construction and its mode of operation, together with additional advantages and objects thereof, will be best understood from the following detailed description of preferred embodiments, when read with reference to the accompanying drawings.

BRIEF DESCRIPTION OF THE DRAWINGS

The drawings show:

FIG. 1 a side view of a blank for forming a fastening element;

FIG. 2 a side view of the blank shown in FIG. 1 with two upset heads;

FIG. 3 a side of the blank shown in FIG. 2 with the blank heads cooperating with pulling tools;

FIG. 4 a side view of the blank similar to that of FIG. 3 in a pull-out condition; and FIG. 5 a side view of the blank, as shown in FIG. 3, after separation of two fastening elements.

DETAILED DESCRIPTION OF THE PREFERRED EMBODIMENT

FIG. 1 shows a cylindrical blank 1 cut-off from a wire, not shown, and having an appropriate length. The blank 1 has a circular cross-section, and its length is greater than a double length of fastening elements 5, 6 shown in FIG. 5.

As shown in FIG. 2, a head 2, 3 is formed at each of the opposite ends of the blank 1 by upsetting respective opposite ends. The two heads 2, 3 have substantially the same volume and the same diameter which exceeds the diameter of the original blank 1.

As shown in FIG. 3, the blank 1 has its opposite heads 2, 3 placed in two, spaced from each other, pulling tools 8 of a pull device, not shown.

As shown in FIG. 4, the pulling tools 8 apply a pulling force F to each of the heads 2, 3. The pulling forces F applied to the opposite heads 2, 3 act in opposite direction parallel to the longitudinal extent of the blank 1. At that, a section 4 of the blank 1, which lies between the two heads 2, 3 is heated. The heat energy acting on the section and the pulling forces F applied to the blank 1 cause formation of two points facing each other and having a somewhat crown-conical shape. The opposite sections of the blank 1 are pulled away from each other until the points of the two sections are separated from each other, forming two fastening elements 5, 6, as shown in FIG. 5.

While FIG. 5 shows that the two fastening elements have the same length, it should be clear that they may have different lengths. To this end, an inductor for producing the heat energy, not shown, should be shifted from its middle position, shown in FIGS. 4–5, sidewise by a distance corresponding to desired lengths of the two fastening elements.

Accordingly, though the present invention was shown and described with references to the preferred embodiments, such are merely illustrative of the present invention and are not to be construed as a limitation thereof and various modifications of the present invention will be apparent to those skilled in the art. It is therefore not intended that the present invention be limited to the disclosed embodiments or details thereof, and the present invention includes all variations and/or alternative embodiments within the spirit and scope of the present invention as defined by the appended claims.

What is claimed is:

1. A method of manufacturing of fastening elements (5, 6), comprising the steps of producing a blank (1) having a length exceeding a combined length of two fastening elements; upsetting a head (2, 3) at each of opposite ends of the blank (1); heating as section of the blank (1) located between the opposite heads (2, 3) formed at the opposite ends of the blank; and, thereafter, pulling apart the heated section (4) until the heated section (4) is separated, Wherein the heating step comprises heating the section (4) between the opposite heads (2, 3) of the blank (1) which has a length that exceeds a thickness of the blank, measured in a direction transverse to a longitudinal extent of the blank, from 2 to 8 times.

2. A method according to claim 1, wherein the upsetting step comprises upsetting the heads (2, 3) so that an outer profile thereof extends beyond an outer profile of the blank in a direction perpendicular to a longitudinal extent of the blank (1).

3. A method according to claim 1, wherein the heating step comprises heating the section (4) located between the opposite heads (2, 3) of the blank (1) to a temperature from about 900° C. to about 1,200° C.

4. A method according to claim 1, wherein the heating step comprises induction heating of the section (4) located between the opposite heads (2, 3) of the blank (1).

5. A method according to claim 1, wherein the pulling apart step comprises placing the opposite heads (2, 3) of the blank (1) in two, spaced from each other, pulling tools displaceable in opposite direction.

6. A method according to claim 5, comprising the step of applying spring forces to the pulling tools for displacing the pulling tools in opposite directions.

7. A method according to claim 6, wherein the spring forces applying step comprises applying forces which generate a pulling force acting on the blank of from 200 N to 2,000 N.

* * * * *